2 Sheets--Sheet 1.

A. PALMER.
Harvester-Rake.

No. 161,981. Patented April 13, 1875.

Witnesses:
G. S. Allis.
H. W. Hopkins.

Inventor
Aaron Palmer,
Pr Geo. M. Hopkins.
Atty.

THE GRAPHIC CO.PHOTO-LITH.39 & 41 PARK PLACE,N.Y.

UNITED STATES PATENT OFFICE.

AARON PALMER, OF ROCHESTER, NEW YORK.

IMPROVEMENT IN HARVESTER-RAKES.

Specification forming part of Letters Patent No. 161,981, dated April 13, 1875; application filed August 8, 1874.

*To all whom it may concern:*

Be it known that I, AARON PALMER, of Rochester, State of New York, have invented certain Improvements in Raking Apparatus for Harvesters, of which the following is a specification:

My invention consists in a rake which shall act in conjunction with the reel, revolving through a part of a revolution on an axis parallel with that of the reel, but not concentric with it, and the rake is made to sweep the sectoral platform and fold in parallel with the beaters of the reel, and immediately behind one or the other of the beaters. This is accomplished by means of a link and segmental gearing arranged, as hereinafter described, so that the rake may pause in its rotation on the horizontal axis while it makes a partial revolution on its vertical axis sufficient to sweep the platform.

The object of the invention is to produce a simple, inexpensive, and light rake, which, folding into the reel, shall throw the grain from the platform.

Figure 1:
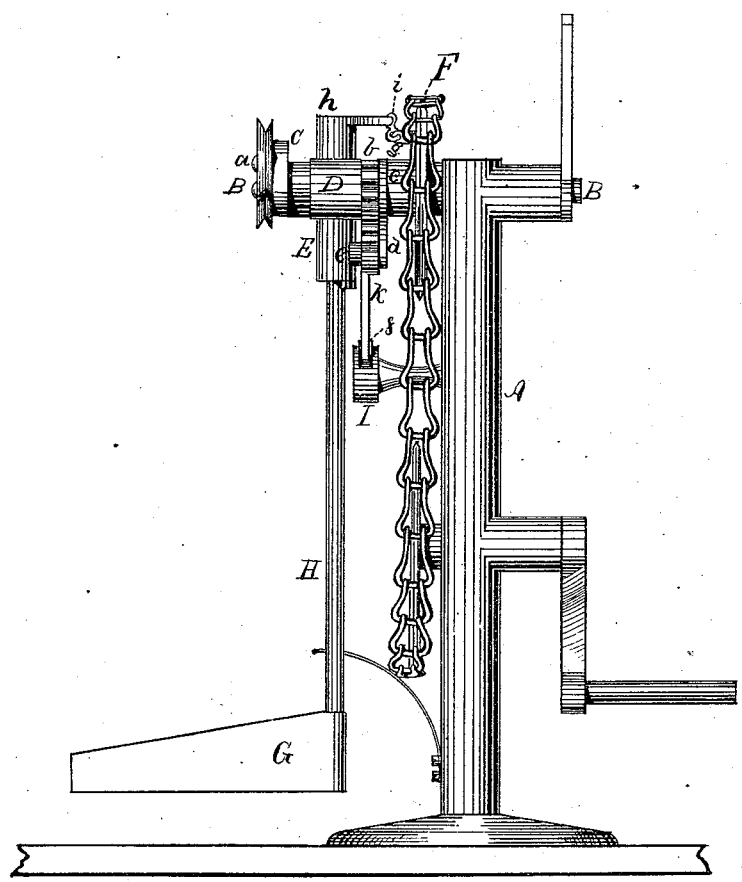
Figure 2:
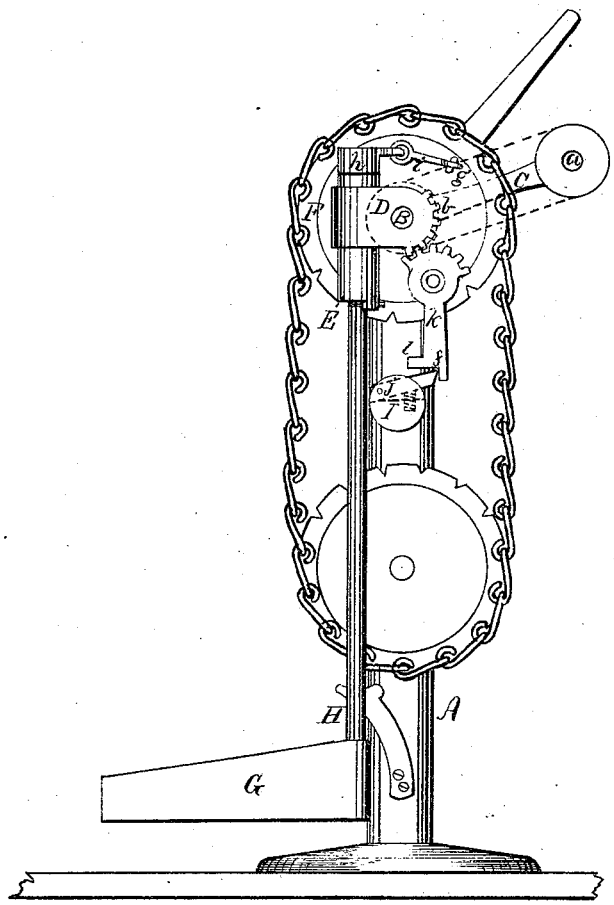

In the accompanying drawings, Figure 1 is a front elevation of the raking apparatus. Fig. 2 is a side elevation of the same.

A is a standard, which has a boss cast upon it, through which the shaft B passes. This shaft supports the reel on the arm C, the reel revolving on the stud $a$. Between the arm C and the standard A a sleeve, D, is placed, on which is cast the sleeve E at right angles with the shaft B. A segment of spur-gearing is also cast on at $b$. On the same shaft, between the sleeve D and the standard A, a chain-wheel, F, is placed, having a boss, $c$, on which the arm $d$ is secured. A stud, $e$, is fixed in this arm, on which is placed a short lever, $k$, provided with a toothed sector on the upper end, which meshes with the segment $b$, and on the lower end with a right-angle notch, $f$, opening downward and toward the rear of the machine. An ear, $g$, is fixed to the wheel F. The rake-head or beater G is fixed to the lower end of the rocking shaft or rake-arm H at right angles. The arm H passes up through the sleeve E, and is provided with a short arm, $h$, which is securely fastened to it. The link $i$ connects the arm $h$ with the ear $g$. A detent, I, which consists of a pawl hinged at $j$, (with a spring placed below it to hold it in position,) is placed on a post, which projects from the standard A in such a position that the notch $f$ in the lower end of the lever $k$ engages with it when the lever stands perpendicular, or nearly so. A lug, $l$, projects from the lever at right angles over the detent, and forms a part of the notch $f$.

Motion is given to the wheel L in any convenient manner. On turning the machine the rake sweeps the platform. It is then thrown upward at the heel or inner end by means of the lever $k$ engaging with the detent I, thus increasing the motion over that which would be imparted directly by the wheel F, the link $i$ pushing the arm $h$ until the rake is horizontal or parallel with the beaters of the reel, when the lug $l$ depresses the detent I as the arm $d$ moves the lever $k$, freeing the rake-arm H, and the rake goes over with the wheel at a uniform speed, striking in with the reel and moving with it until the rake-arm is vertical, with the rake down or over the cutter-bar, when the link $i$ draws on the lever $h$, and causes the rake to again sweep the platform. A lug projects from the lower end of the sleeve E, and a pin is placed in the rake-arm to prevent it from moving too far in either direction.

Having thus described my invention, what I claim as new, and desire to secure by Letters Patent, is—

The combination of the rake-arm H, lever $h$, link $i$, ear $g$, sleeves D and E, wheel F, segment $b$, lever $k$, arm $d$, and detent I, for producing an alternate sweeping and rotating motion in the rake, substantially as herein described.

AARON PALMER.

Witnesses:
CHARLES A. GREEN,
H. M. HOPKINS.